Nov. 29, 1938.  E. C. SAINT-JACQUES  2,138,072
PROPELLER AND LIKE ROTARY MEMBER
Filed June 8, 1935

INVENTOR
Eugène Camille Saint-Jacques
by his att'ys
Byrnes, Stebbins & Blenko

Patented Nov. 29, 1938

2,138,072

UNITED STATES PATENT OFFICE 2,138,072

PROPELLER AND LIKE ROTARY MEMBER

Eugène Camille Saint-Jacques, Paris, France

Application June 8, 1935, Serial No. 25,605
In France June 16, 1934

2 Claims. (Cl. 170—172)

In rotary members moving in a gaseous or liquid fluid or intended to displace this fluid, such for example as the propellers of aeroplanes or boats, windmills, the rotors of fans etc., there is formed towards the centre of rotation of the member a vortex or eddy which becomes greater as the speed of rotation increases. This vortex absorbs a considerable part of the energy and in consequence reduces the mechanical yield of the apparatus.

The present invention has for its object an improvement applied to rotary members of the above kind with the object of suppressing the disadvantage which has been mentioned. For this purpose this improvement consists essentially in arranging at the centre of the member (propeller, fan, rotor, etc.) a space of truncated cone form opening on both sides of this member and the small base of which is situated on the front face of this latter.

From the very fact of the rotation this space draws in the gases or liquids which tend to collect at the centre of the member, that is to say at the summit of the cone body, and exhausts them towards the back causing them to circulate from the small base towards the large base of the said cone body, due to the well known property which cones possess when they are driven with a rotary movement, of transferring their contents towards the place of their largest dimension. There is thus not produced a vortex at the centre of the machine but a continuous circulation of the liquid or gaseous fluid, this being by reason of the conical form of the space, diffused to the periphery of this latter and mixed with the mass of liquid or gas in movement.

In the common case when the propeller or the rotor is to be driven or to transmit a movement of rotation by its centre, the driving or driven shaft to which it will be fixed may traverse the truncated cone space from the base to the summit and be connected to the internal wall of the body of the cone by spokes, preferably curved inwardly so as to facilitate the circulation of the gases or liquids from in front to the back.

In this specification and the appended claims, the word "propeller" is used to denote propellers suitable for use in aeroplanes, boats and like structures, as well as the rotors of fans or vanes of wind mills, etc.

The attached drawing shows by way of non-limiting example a propeller set up according to the invention.

Figure 1:
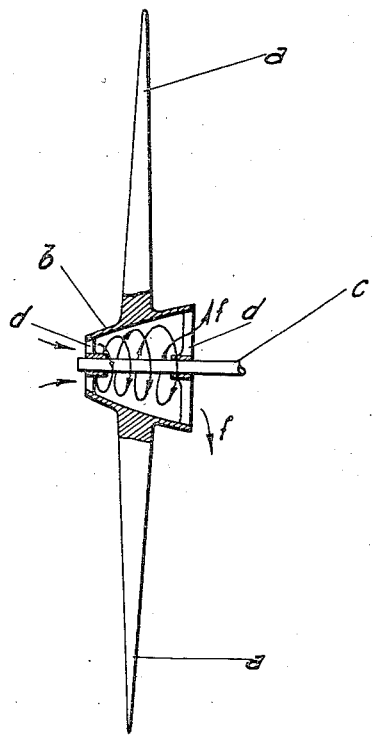
Figure 1 is a profile view of this propeller with the hollowed hub in section.
Figure 2:
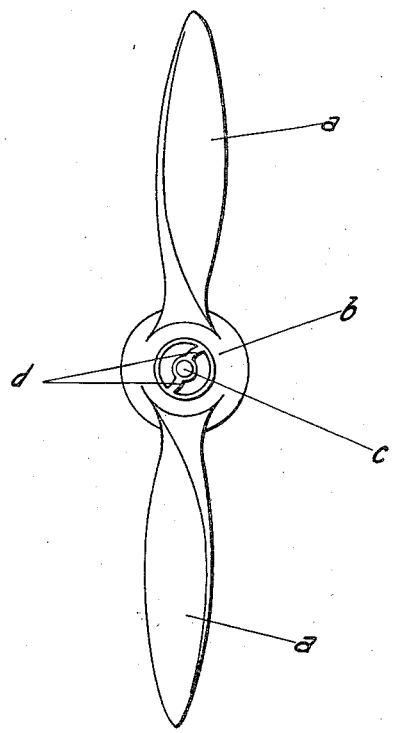
Figure 2 is a face view.

On the drawing a—a are the blades of the propeller integral with a hub b the diameter of which is in proportion to the width of the blade, the hub has at its centre a truncated cone space the small base of which is situated upon the front face of the propeller. The shaft c serving for the drive of the propeller passes through this space and is connected to the internal wall of the hub by inwardly curved spokes d at the front and rear thereof terminating in central bosses through which the shaft C extends. As has been explained above if the propeller thus constituted moves for example in air, the mass of air which tends to accumulate at its centre is drawn towards the back through the truncated conical hollowed hub in a spiral direction as shown by the arrows f.

The spokes d may also extend over the whole length of the hub.

I claim:

1. In a propeller, a hollow hub having therethrough a space of the form of a truncated cone coaxial with the axis of rotation of the propeller, the small base of said cone being disposed towards the front of the propeller and the large base towards the rear, blades mounted at their inner terminals on said hub, means inside the space and coaxial therewith for mounting the propeller on a shaft, and spokes at both front and rear of the hub having longitudinal dimensions less than the longitudinal dimension of the hub connecting said mounting with the hub, said spokes being curved inwardly to facilitate the circulation of the fluid through which the propeller moves from the small end of the cone through to the large end, the blades having a large area of sweep in comparison to the area of the sweep of the hub.

2. A propeller having a hub, blades extending from the hub, the diameter of the hub being in proportion to the width of the blades, the hub being provided with an opening therethrough of truncated cone form with the small end towards the front of the propeller, bosses within the opening in the hub having openings therethrough for a drive shaft, and curved spokes at the front and rear of the hub for connecting the bosses to the inner face of the hub.

EUGÈNE CAMILLE SAINT-JACQUES.